(12) United States Patent
Kim et al.

(10) Patent No.: US 11,999,321 B2
(45) Date of Patent: Jun. 4, 2024

(54) WIPER BLADE FOR VEHICLE

(71) Applicants: HYUNDAI MOTOR COMPANY, Seoul (KR); KIA CORPORATION, Seoul (KR); DY AUTO CORPORATION, Asan-si (KR)

(72) Inventors: Hun Jae Kim, Hwaseong-si (KR); Joon Woo Lee, Suwon-si (KR); Kun Woo Choung, Incheon (KR)

(73) Assignees: HYUNDAI MOTOR COMPANY, Seoul (KR); KIA CORPORATION, Seoul (KR); DY AUTO CORPORATION, Asan-si (KR)

( * ) Notice: Subject to any disclaimer, the term of this patent is extended or adjusted under 35 U.S.C. 154(b) by 0 days.

(21) Appl. No.: 17/890,055

(22) Filed: Aug. 17, 2022

(65) Prior Publication Data
US 2023/0137531 A1   May 4, 2023

(30) Foreign Application Priority Data

Nov. 3, 2021  (KR) .......................... 10-2021-0149933

(51) Int. Cl.
*B60S 1/52* (2006.01)
*B60S 1/04* (2006.01)
*B60S 1/34* (2006.01)

(52) U.S. Cl.
CPC ............ *B60S 1/522* (2013.01); *B60S 1/3415* (2013.01); *B60S 1/3429* (2013.01); *B60S 1/3497* (2013.01); *B60S 1/0491* (2013.01)

(58) Field of Classification Search
CPC .... B60S 1/3415; B60S 1/3429; B60S 1/3497; B60S 1/522; B60S 1/524; B60S 1/0491

USPC ........................................ 15/250.04, 250.351
See application file for complete search history.

(56) References Cited

U.S. PATENT DOCUMENTS

| | | | |
|---|---|---|---|
| 5,842,251 A  * | 12/1998 | LeFrançois | ........... B60S 1/3497 |
| | | | 15/250.04 |
| 10,035,496 B2 | 7/2018 | Caillot et al. | |
| 2019/0152442 A1* | 5/2019 | Umeno | ................ B60S 1/3415 |

FOREIGN PATENT DOCUMENTS

| | | | |
|---|---|---|---|
| CN | 209757053 U | | 12/2019 |
| DE | 19914122 A1 | | 9/2000 |
| DE | 102010064178 | * | 6/2012 |
| DE | 102013212055 A1 | | 1/2015 |
| EP | 3392098 A1 | | 10/2018 |
| FR | 3026705 B1 | | 1/2018 |
| JP | 6282624 B2 | | 2/2018 |
| JP | 6492748 B2 | | 4/2019 |
| JP | 6578771 B2 | | 9/2019 |
| KR | 2016-0081938 A | | 7/2016 |

* cited by examiner

*Primary Examiner* — Gary K. Graham
(74) *Attorney, Agent, or Firm* — MCDONNELL BOEHNEN HULBERT & BERGHOFF LLP

(57) ABSTRACT

A wiper blade for a vehicle includes a wiper arm having one end installed at a windshield glass side and configured to rotate, and the other end at which an installation bracket is provided, a blade mounted on the installation bracket of the wiper arm and configured to clean a windshield glass, and a nozzle installed on an assembling part extending outward from the installation bracket of the wiper arm, the nozzle being positioned between the assembling part and the blade and configured to spray a cleaning liquid in a longitudinal direction in which the blade extends.

7 Claims, 13 Drawing Sheets

DURABILITY AGAINST SNOW DEPOSITED 60,000 TIMES,
NO DAMAGE (OK)

NO WITHDRAWAL OF AND DAMAGE TO BLADE, NOZZLE,
AND COVER ACCORDING TO RESULT OF EVALUATING
DURABILITY AGAINST ARTIFICIAL SNOW (OK)

WIPER BLADE FOR VEHICLE

CROSS REFERENCE TO RELATED APPLICATIONS

The present application claims priority to Korean Patent Application No. 10-2021-0149933, filed Nov. 3, 2021, the entire contents of which is incorporated herein for all purposes by this reference.

BACKGROUND

Field

The present disclosure relates to a wiper blade for a vehicle, and more particularly, to a wiper blade for a vehicle, in which a nozzle configured to spray a cleaning liquid is assembled to be accommodated in a wiper arm, such that performance of the nozzle is maintained constantly by minimizing influences of external environment and external forces, and costs are significantly reduced by a simple structure for assembling the blade and the nozzle.

Description of the Related Art

A wiper blade for a vehicle refers to a device installed on a vehicle to ensure a front visual field of a driver by wiping a windshield glass when the front visual field of the driver is limited by rainfall, snowfall, dust, or the like while the driver drives the vehicle.

It is not necessary to spray a cleaning liquid in case of rainfall or snowfall, but it is necessary to spray the cleaning liquid to remove soil, dust, fine dust, and the like attached to the windshield glass. In the related art, a nozzle configured to spray the cleaning liquid is provided on a hood or a cover of a cowl of the vehicle and disposed at a lower end of the windshield glass.

Since the nozzle is positioned at the lower end of the windshield glass, the cleaning liquid cannot be uniformly applied onto an uppermost end of the windshield glass, which causes a deterioration in cleaning performance. Further, the cleaning liquid is sprayed in a direction opposite to the gravity, and a part of the cleaning liquid scatters toward unnecessary positions such as the cowl of the vehicle other than the glass, which causes strains and degrades an external appearance.

To solve these problems, a configuration in which a nozzle is coupled to a wiper blade instead of being coupled to a lower end of a windshield glass is applied. When the nozzle is positioned adjacent to a middle portion of the wiper blade and sprays the cleaning liquid in two directions, the cleaning liquid is uniformly distributed to both an uppermost end and a lowermost end of the windshield glass, thereby improving cleaning performance. However, there is a problem in that the nozzle exposed to the outside of the wiper blade may be damaged by deposited snow in case of snowfall or damaged by being exposed directly to an artificial external force.

A separate component may be provided to protect the nozzle in order to solve the above-mentioned problem, but there is a problem with compatibility between the separate component and the wiper blade. This problem directly leads to an increase in development costs and acts as a direct cause of an increase in vehicle costs.

The above-mentioned matters described as the background art are provided merely to aid understanding of the background of the present disclosure, and should not be construed to admit that the matters correspond to the technologies already known to those skilled in the art.

SUMMARY

The present disclosure is proposed to solve these problems and aims to provide a wiper blade, in which a nozzle is provided on a wiper blade and accommodated inside a wiper arm, which may eliminate a separate cover for protecting the nozzle, and the nozzle and a blade are assembled directly to the wiper arm, which may simplify a structure of the wiper blade.

An exemplary embodiment of the present disclosure provides a wiper blade for a vehicle, the wiper blade including a wiper arm having one end installed at a windshield glass side and configured to rotate, and the other end at which an installation bracket is provided, a blade mounted on the installation bracket of the wiper arm and configured to clean a windshield glass, and a nozzle installed on an assembling part extending outward from the installation bracket of the wiper arm, the nozzle being positioned between the assembling part and the blade and configured to spray a cleaning liquid in a longitudinal direction in which the blade extends.

The nozzle may be assembled by being fitted with the assembling part in a perpendicular direction.

The installation bracket may include an extension portion extending outward, and a bent portion bent downward from an end of the extension portion, and an installation space may be defined between the bent portion and the blade by the extension portion, and the nozzle is disposed in the installation space.

The nozzle may be disposed below the extension portion, and the extension portion may cover an upper portion of the nozzle.

A catching groove may be formed in the bent portion, a catching protrusion may be formed on the nozzle, and the nozzle may be assembled to the bent portion as the catching protrusion is fitted into the catching groove.

The nozzle may include a nozzle body, and an outer part spaced apart outward from the nozzle body, and the bent portion may be fitted between the nozzle body and the outer part.

Catching protrusions may be respectively formed on the nozzle body and the outer part so as to face each other, and the nozzle may be assembled to the bent portion as the catching protrusions, which face each other, are fitted into a catching groove of the bent portion when the bent portion is fitted between the nozzle body and the outer part.

The nozzle may be assembled so that one surface of the nozzle and one surface of the blade adjoin each other.

A support body having elasticity may be provided on one surface of the nozzle, which adjoin the blade, and support one surface of the blade.

A hose configured to transmit the cleaning liquid to the nozzle may be provided and connected to an injection port of the nozzle.

A cover configured to cover the wiper arm may be provided at an upper end of the wiper arm, a hose clip configured to fix the hose may be provided at one side of the cover, and the hose may be fitted with the hose clip.

The installation bracket may include an extension portion extending outward, and a bent portion bent downward from an end of the extension portion, the nozzle may include: a nozzle body, and an outer part spaced apart outward from the nozzle body, the cover may be provided to cover the wiper arm to the extension portion of the wiper arm without covering the bent portion, and the outer part of the nozzle may be exposed to the outside of the wiper arm.

The cleaning liquid sprayed from the nozzle to the windshield glass may reach first and second water reaching points positioned in opposite directions, and the time it takes for the cleaning liquid to reach the first and second water reaching points may be 80 ms to 90 ms.

Assuming that a length of one half of the blade is L, a distance from a lower end of the blade to a center of the nozzle is D, and a center of the lower end of the blade is (0, 0), the first and second water reaching points may be spaced apart from (0, 0) by L/3 to L/1.7 or −L/3 to −L/1.7 in an x-axis direction and by 2.3D to 3.3D in a y-axis direction.

The time it takes for the cleaning liquid, which has reached the first and second water reaching points, to come into contact with the windshield glass and reach two opposite ends of the blade may be 160 ms to 180 ms.

According to the wiper blade according to the present disclosure, the nozzle is installed on the wiper blade, and particularly, the nozzle is assembled to be accommodated in the wiper arm, thereby minimizing the influence applied to the nozzle by the external environment or external forces. The optimum design of the water reaching points makes it possible to obtain sufficient cleaning performance even by using only the single nozzle. Even though the outer portion of the wiper arm is damaged by an external force, the assembled state of the internal assembling structure may be maintained, thereby preventing the withdrawal of the nozzle.

DETAILED DESCRIPTION

Hereinafter, specific contents for solving the above-mentioned problems and achieving the above-mentioned object will be described below in detail with reference to the accompanying drawings. Meanwhile, the detailed description of publicly known related technologies in the same field will be omitted when it is determined that the detailed description is not helpful in understanding the subject matter of the present disclosure. The technical spirit of the present disclosure is not limited thereto and may be variously modified and carried out by those skilled in the art.

Figure 1:
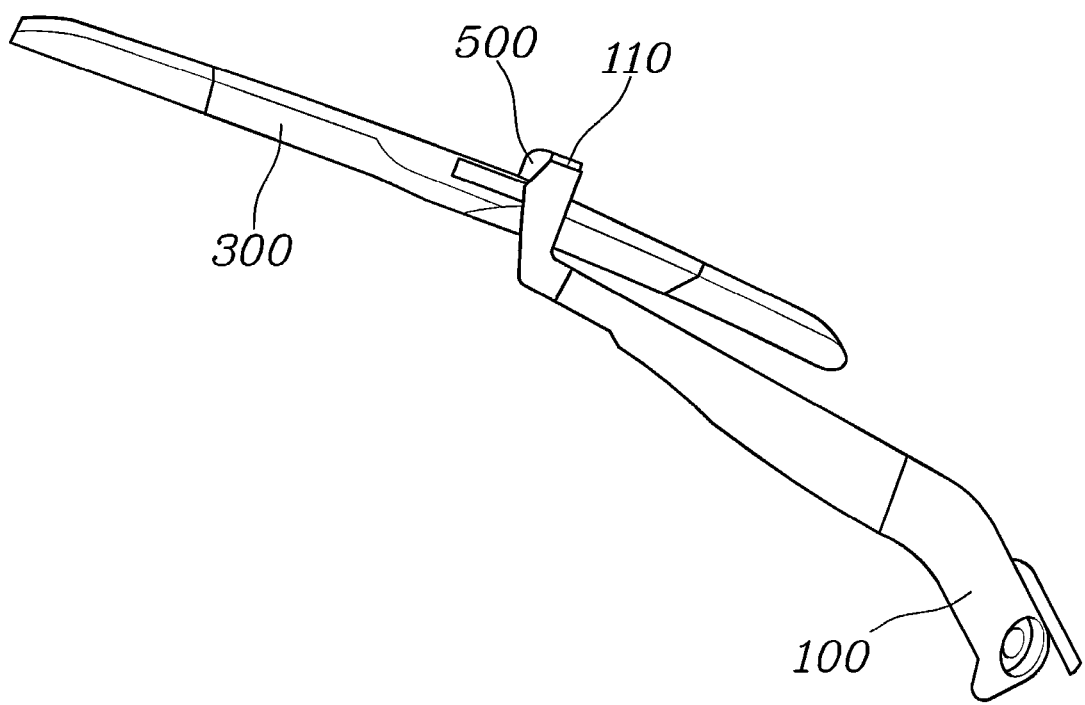
FIG. 1 is a view illustrating a wiper blade for a vehicle according to an embodiment of the present disclosure
Figure 2:
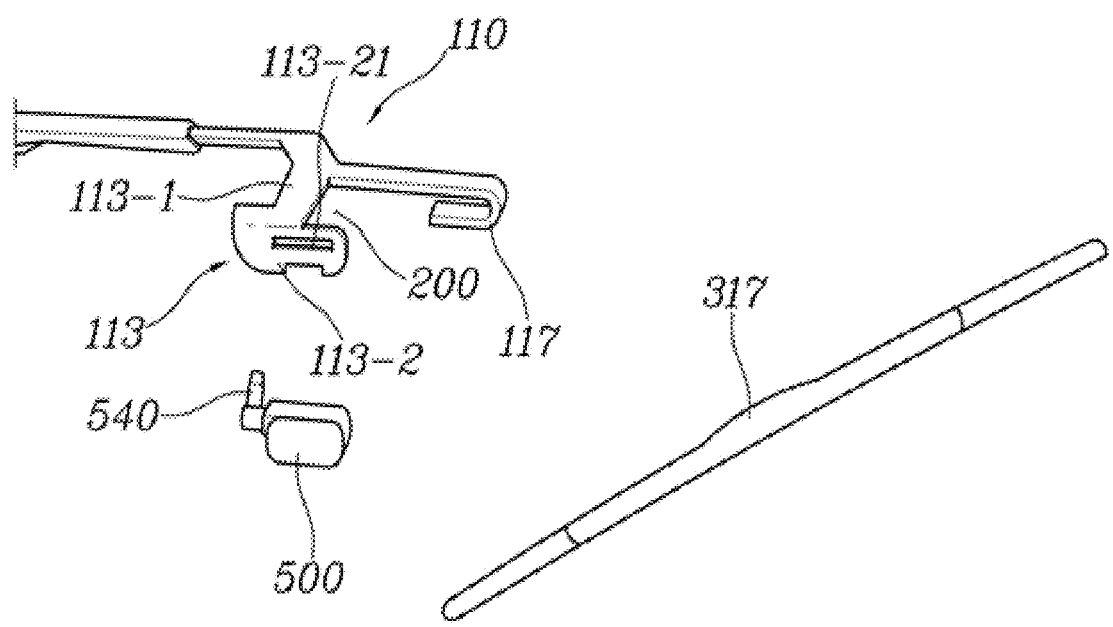
FIG. 2 is a view illustrating an installation bracket of a wiper arm, a nozzle, and a blade.

FIG. 1 is a view illustrating a wiper blade for a vehicle according to an embodiment of the present disclosure, and FIG. 2 is a view illustrating an installation bracket of a wiper arm, a nozzle, and a blade. Referring to FIGS. 1 and 2, a wiper blade for a vehicle according to the present disclosure includes a wiper arm 100 having one end installed at a windshield glass side and configured to rotate, and an installation bracket 110 positioned at the other end. A blade 300 is mounted on the installation bracket 110 of the wiper arm 100 and is configured to wipe a windshield glass. A nozzle 500 is positioned on an assembling part 113 extending outward from the installation bracket 110 of the wiper arm 100. The nozzle 500 is positioned between the assembling part 113 and the blade 300, and is configured to spray a cleaning liquid in a longitudinal direction in which the blade 300 extends.

The nozzle 500 is provided on the wiper blade. In particular, the nozzle 500 may be assembled to be positioned inside the wiper arm 100. The nozzle 500 is positioned on the wiper blade and sprays the cleaning liquid in two directions (the longitudinal direction of the blade). Therefore, it is possible to clean the entire surface of the windshield glass under the optimized condition without contamination of a cowl which is caused by a configuration in the related art in which a nozzle is positioned at a lower end of a windshield glass of a vehicle body and sprays a cleaning liquid unnecessarily to a cowl or the like of a vehicle.

In addition, because the nozzle 500 does not protrude to the outside of the wiper arm 100, it is not necessary to separately install a component for protecting the nozzle 500. Further, the nozzle 500 is positioned on the blade 300 and the assembling part 113 of the installation bracket 110 of the wiper arm 100, such that the influences of external environment and external forces may be minimized, and the nozzle 500 may be protected from the outside.

Meanwhile, the blade 300 may be assembled to a blade coupling portion 117 protruding outward from the installation bracket 110. The blade coupling portion 117 may be a hook having a 'U' shape and fitted with a blade assembling part 317 positioned at a middle portion of the blade, such that the blade may be installed on the installation bracket 110.

Figure 3:
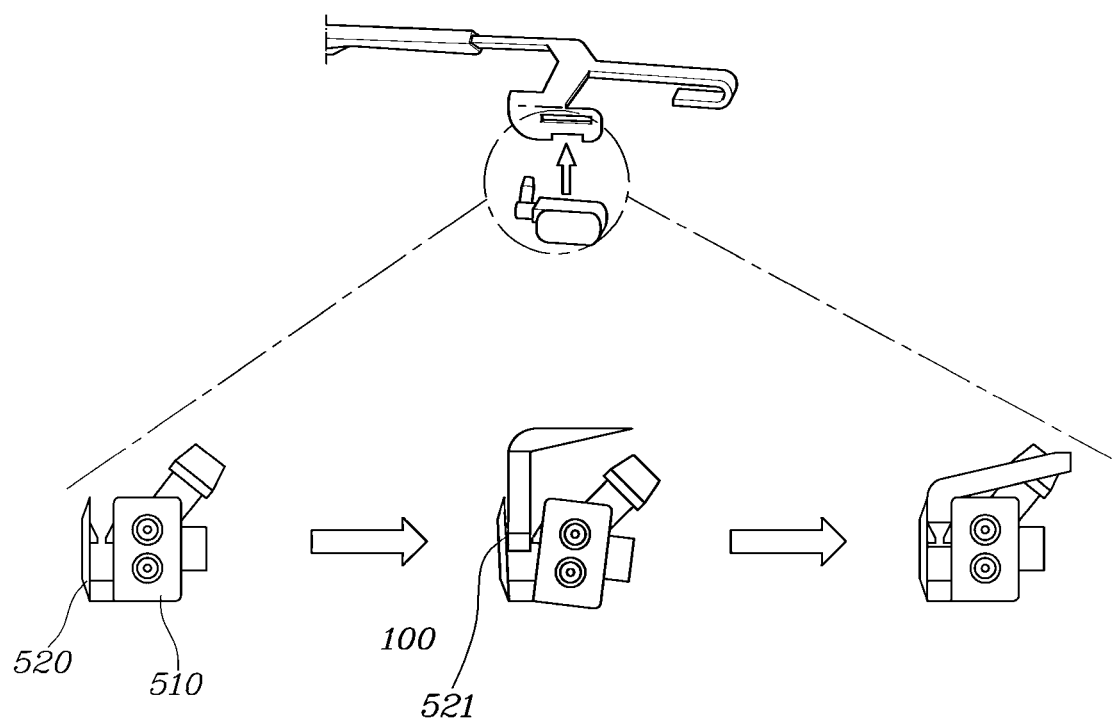
FIGS. 3 and 4 are views schematically illustrating a process of assembling the nozzle to a bent portion of the installation bracket of the wiper arm.

Meanwhile, the nozzle 500 may be assembled and fitted with the assembling part 113 of the installation bracket 110 in a perpendicular direction. Specifically, referring to FIGS. 2 and 3, the assembling part 113 has an extension portion 113-1 extending outward from the installation bracket 110, and a bent portion 113-2 bent downward from an end of the extension portion 113-1. An installation space 200 may be defined between the bent portion 113-2 and the blade 300 by the extension portion 113-1, and the nozzle 500 may be disposed in the installation space 200.

The nozzle 500 is coupled to the assembling part 113 from below to above the assembling part 113. A catching groove 113-21 is formed in the bent portion 113-2, and catching protrusions 521 are formed on the nozzle 500, such that the nozzle 500 may be assembled to the bent portion 113-2 as the catching protrusions 521 are fitted into the catching groove 113-21.

More specifically, the nozzle 500 includes a nozzle body 510 and an outer part 520 spaced apart outward from the nozzle body 510, and the nozzle 500 and the bent portion 113-2 are assembled as the bent portion 113-2 is fitted between the nozzle body 510 and the outer part 520. In this case, the catching protrusions 521 are respectively formed on the nozzle body 510 and the outer part 520 so as to face each other. When the bent portion 113-2 is fitted between the nozzle body 510 and the outer part 520, and the catching protrusions 521, which face each other, are fitted into the catching groove 113-21 of the bent portion 113-2, such that the nozzle 500 may be assembled to the bent portion 113-2.

The nozzle 500 is assembled such that the outer part 520 of the nozzle 500 is directed outward and the nozzle body 510 is directed toward the blade 300. The nozzle 500 is disposed below the extension portion 113-1 of the installation bracket 110, such that the extension portion 113-1 covers an upper portion of the nozzle 500 to protect the nozzle 500, and the bent portion 113-2 covers a lateral portion of the nozzle 500 to protect the nozzle 500.

Figure 4:
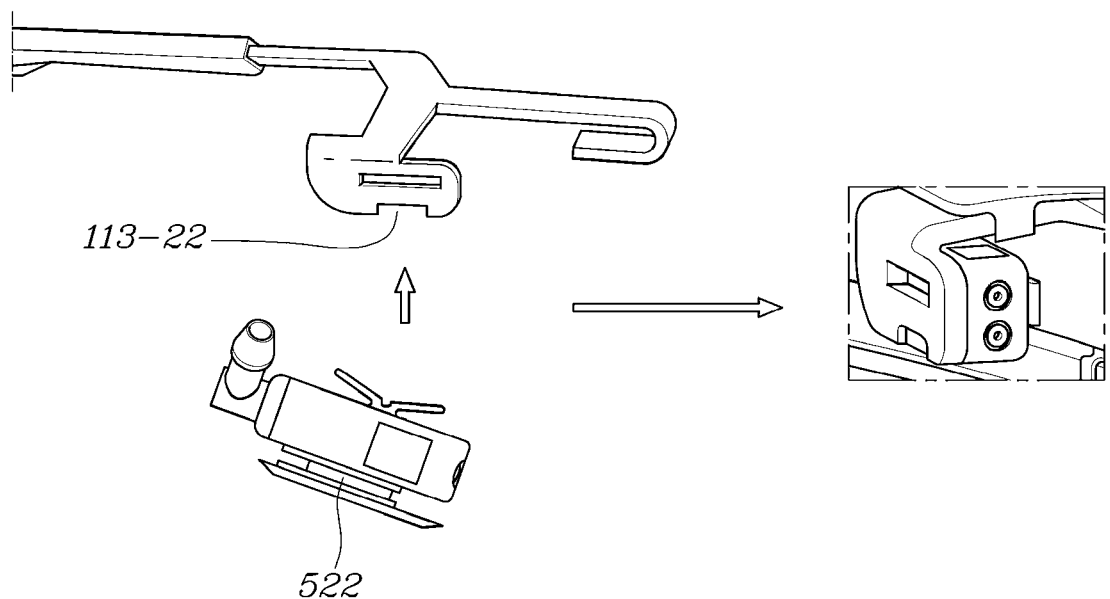

Meanwhile, referring to FIG. 4, a leg portion 113-22 is formed at a lower side of the bent portion 113-2. When the nozzle 500 and the bent portion 113-2 are assembled, a leg coupling portion 522 of the nozzle 500 corresponds to and adjoins the leg portion 113-22 of the bent portion 113-2 to prevent the nozzle 500 coupled to the bent portion 113-2 from moving in a leftward/rightward direction. The catching protrusions 521 fitted into the catching groove 113-21 may fix the nozzle 500 to prevent the nozzle coupled to the bent portion 113-2 from moving in an upward/downward direction.

Therefore, even though an outer structure of the installation bracket 110 is partially damaged by an external force, the nozzle 500 may be stably fixed and prevented from being withdrawn from the wiper blade.

Meanwhile, the nozzle 500 and the blade 300 may be assembled so that one surface of the nozzle 500 and one surface of the blade 300 adjoin each other. As described above, the nozzle 500 may be assembled to the bent portion 113-2 of the installation bracket 110, and the blade 300 may be assembled to the blade coupling portion 117 protruding outward from the installation bracket 110.

In this case, one side surface of the nozzle 500 may adjoin one side surface of the blade 300. If the nozzle 500 is not in close contact with the blade 300, the cleaning liquid cannot reach a designed water reaching point on the windshield glass because of vibration occurring while the vehicle travels. Therefore, the nozzle 500 may be in close contact with the blade 300.

Figure 5A:
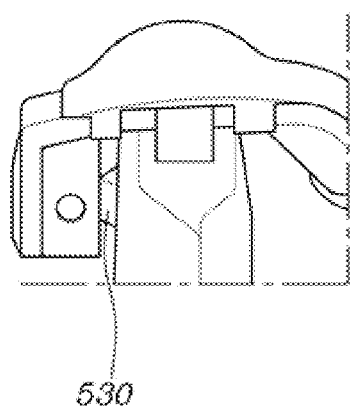
FIG. 5A is a rear view illustrating the wiper blade in which the nozzle and the blade are assembled.
Figure 5B:
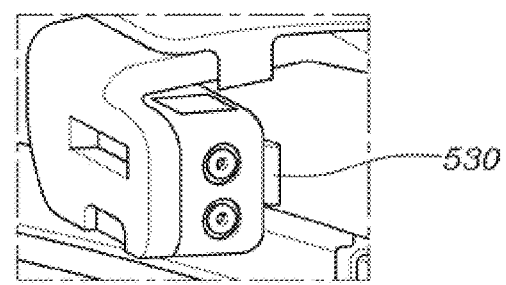
FIG. 5B is a left perspective view of the nozzle blade.

In one embodiment, a support body 530 having elasticity is disposed on one surface of the nozzle 500 that adjoins the blade 300, and the support body 530 supports one surface of the blade 300. Referring to FIGS. 5A and 5B, the support body 530 having elasticity supports one surface of the blade 300, such that the influence of vibration, which may occur while the vehicle travels, may be minimized, and the cleaning performance may be maintained. In addition, the influence of vibration, which occurs because of a difference in velocity between front and rear ends of the blade 300 during a wiping operation of the wiper blade, may be minimized, and the cleaning performance may be maintained.

In addition, the blade 300 and the nozzle 500 are continuously in contact with each other, and the bent portion 113-2 and the nozzle 500 are continuously in contact with each other. Therefore, the nozzle 500 is fixed so that the nozzle 500 is not withdrawn from the installation space 200, and the nozzle 500 may continue to perform the function thereof even though the outer structure of the installation bracket 110 is partially damaged by an external force.

Figure 6:
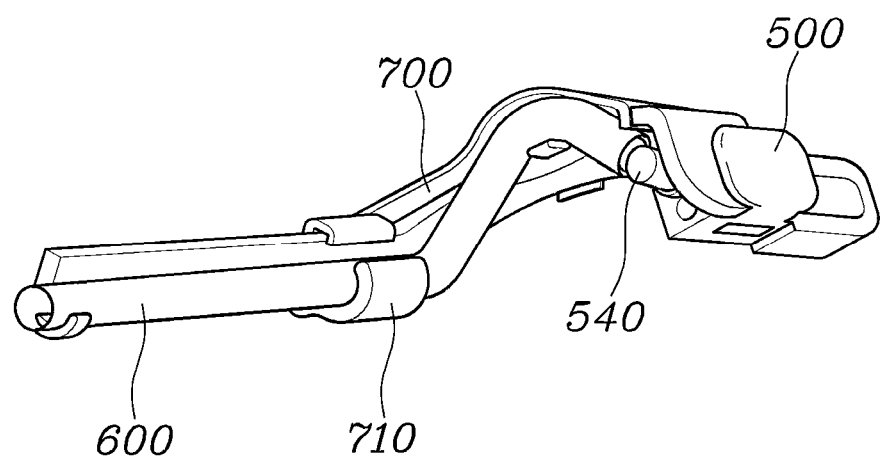
FIG. 6 is a right perspective view of the wiper blade.
Figure 7:
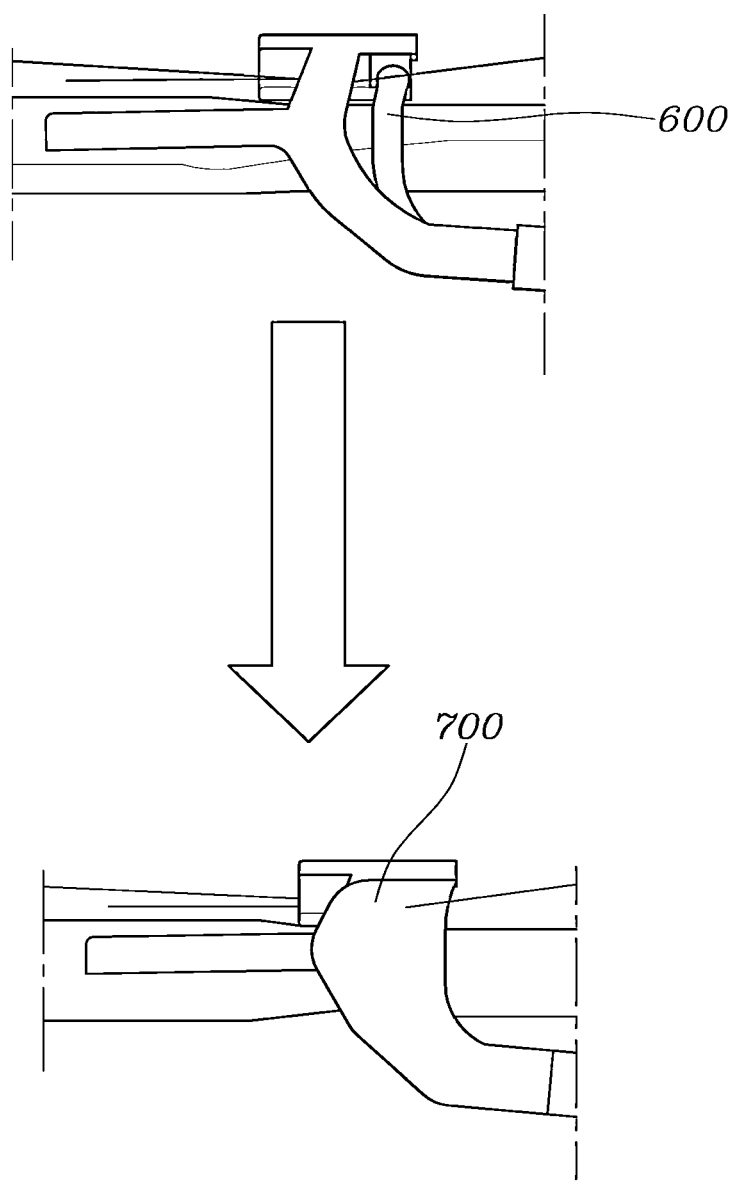
FIG. 7 is a view illustrating a state in which a cover is assembled to an upper end of the wiper arm.

Meanwhile, referring to FIGS. 6 and 7, the nozzle 500 has an injection port 540 through which the cleaning liquid is injected into the nozzle 500. Further, a hose 600 may be provided to transmit the cleaning liquid to the nozzle 500 and connected to the injection port 540 of the nozzle 500.

A cover 700 may be disposed at an upper end of the wiper arm 100 and cover the wiper arm 100. The hose 600 is fixed to the cover 700 by being fitted with a hose clip 710 disposed at one side of the cover 700. The hose clip 710 may be provided in plural. The hose 600 may be fitted with the hose clip 710, and an upper end of the hose 600 is covered by the cover 700, such that the hose 600 may be protected from the external environment, as illustrated in FIG. 7.

The cover 700 covers the wiper arm 100 to the extension portion 113-1 of the wiper arm 100 but does not cover the bent portion 113-2, such that the outer part 520 of the nozzle 500 is exposed to the outside of the wiper arm 100.

Figure 8:
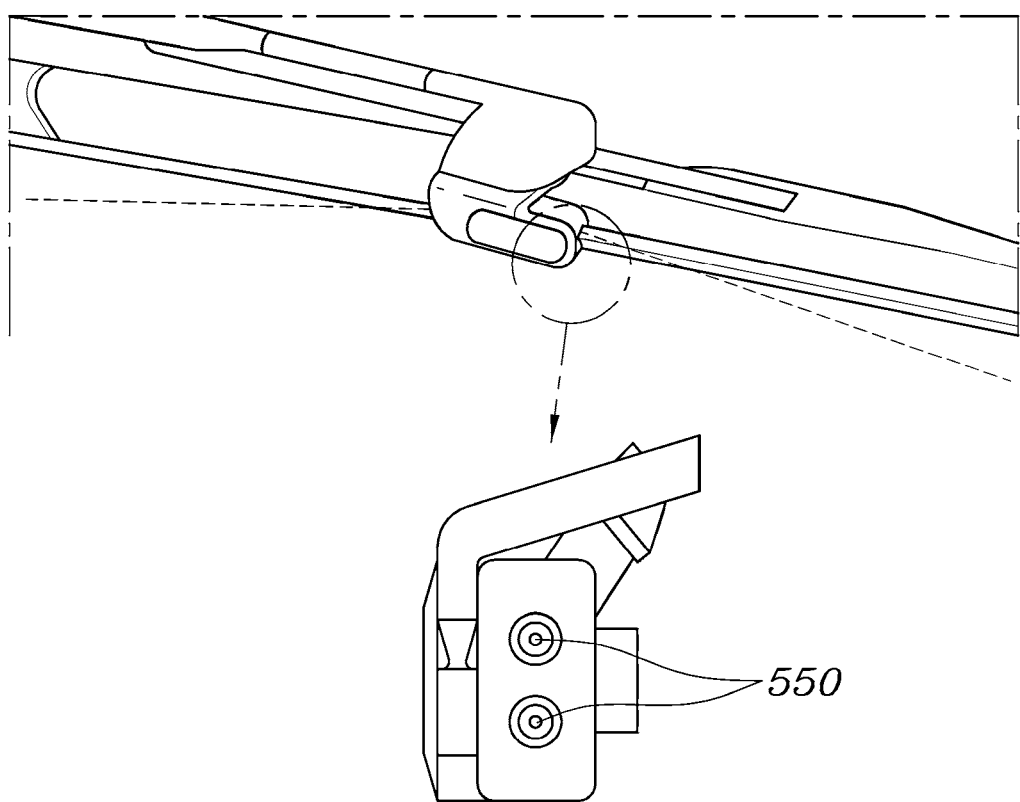
FIG. 8 is a rear enlarged view of the nozzle of the wiper blade.
Figure 9:
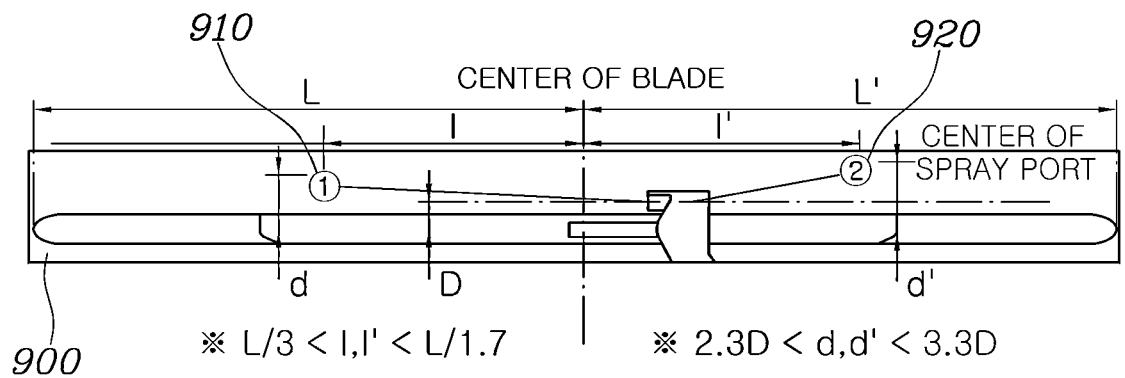
FIG. 9 is a view for explaining a first water reaching point and a second water reaching point.

Meanwhile, referring to FIGS. 8 and 9, spray ports 550, through which the cleaning liquid is sprayed toward a windshield glass 900, are provided on two opposite surfaces of the nozzle 500. Four spray ports 550 may be provided on the nozzle, and the two spray ports 550 may be provided on each of the two opposite surfaces of the nozzle 500.

When the cleaning liquid is sprayed from the spray ports 550, the cleaning liquid reaches a first water reaching point 910 and a second water reaching point 920 at which the cleaning liquid comes into contact with the windshield glass 900 first. The first and second water reaching points 910 and 920 are designed in opposite directions with the nozzle interposed therebetween. The time it takes for the cleaning liquid to reach the first and second water reaching points 910 and 920 may be 80 ms to 90 ms. In this case, a pressure of the cleaning liquid sprayed from the spray port 550 may be equal to or higher than 1 bar.

The cleaning liquid, which has reached the first and second water reaching points 910 and 920, is widely diffused on the windshield glass 900 as kinetic energy thereof is converted into surface tension energy on the surface of the windshield glass 900 surface, and then the cleaning liquid flows in the longitudinal direction of the blade 300, i.e., toward the front and rear ends of the blade 300.

In this case, when the pressure of the cleaning liquid sprayed from the spray port 550 is equal to or higher than 1 bar, the time it takes for the cleaning liquid, which has reached the first and second water reaching points 910 and 920, to come into contact with the windshield glass 900 and reach the front and rear ends of the blade 300 may be 160 ms to 180 ms.

That is, the time it takes for the cleaning liquid to be diffused to the front end of the blade from the first water reaching point 910 and the time it takes for the cleaning liquid to be diffused to the rear end of the blade from the second water reaching point 920 may also be 80 ms to 90 ms.

To design the configuration in which the time it takes for the cleaning liquid to be diffused to the two opposite ends of the blade 300 is 160 ms to 180 ms, the positions of the first and second water reaching points 910 and 920 need to be designed as follows.

Referring to FIG. 9, assuming that a length of one half of the blade 300 is L, a distance from a lower end of the blade 300 to a center (spray port) of the nozzle 500 is D, and a center of the lower end of the blade 300 is (0, 0), I, which is an x-axis coordinate of the first water reaching point 910, may be positioned at $-L/3$ to $-L/1.7$, I', which is an x-axis coordinate of the second water reaching point, may be positioned at $L/3$ to $L/1.7$, and d and d', which are y-axis coordinates of the first and second water reaching points, may be positioned at positions spaced apart from the center of the nozzle by $2.3D$ to $3.3D$.

After the sprayed cleaning liquid is diffused within 180 ms to the two opposite ends of the blade 300, the blade 300 operates within a range of 200 ms to 300 ms to clean the windshield glass 900. Therefore, the cleaning liquid is uniformly distributed in the longitudinal direction of the blade 300 before the wiper blade operates.

Figure 10A:
FIGS. 10A, 10B, 11, 12, and 13 are views illustrating results of testing the wiper blade for a vehicle according to the embodiment of the present disclosure.
Figure 10B:
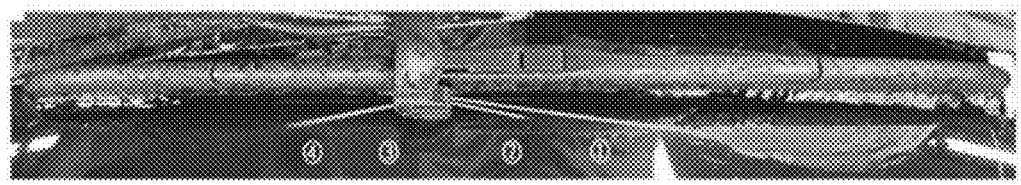

FIG. 10A is a view illustrating a state in which the wiper blade according to the embodiment of the present disclosure is mounted, and FIG. 10B is a photograph illustrating a result of testing the spraying of the cleaning liquid. Referring to FIG. 10B, it was ascertained that the cleaning liquid sprayed from the nozzle was uniformly distributed within the designed time to the two opposite ends of the blade.

Figure 11:
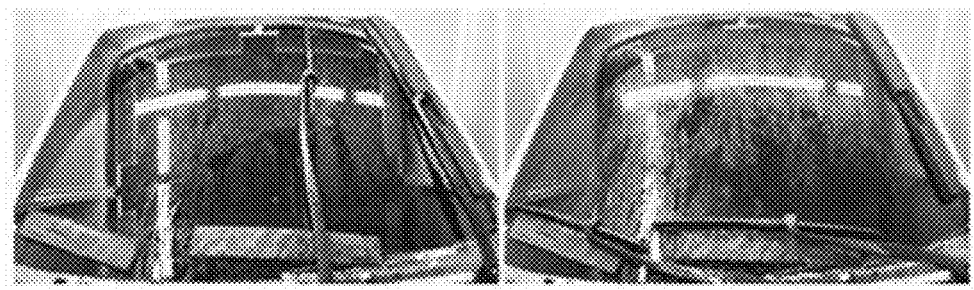
Figure 11:
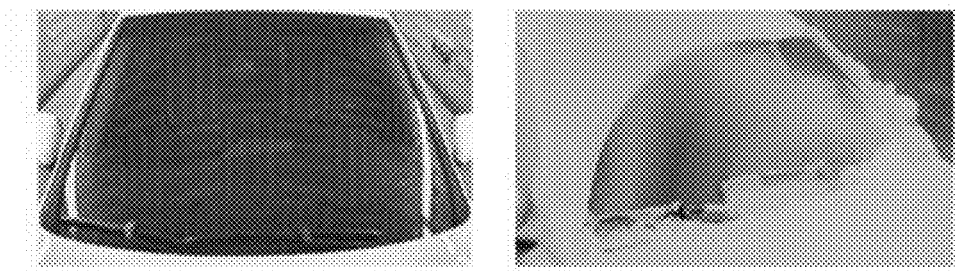

FIG. 11 is a photograph illustrating durability test results under conditions in which snow is deposited on the wiper blade according to the embodiment of the present disclosure. It was ascertained that the wiper blade was excellent in durability because the respective components of the wiper blade were not damaged or withdrawn even under the condition in which snow was deposited 60,000 times (after the wiper blade was left unattended for 10 hours or more at a test temperature of −30° C., artificial snow was sprayed to the wiper blade, and then the wiper blade was operated at the lowest rotation velocity until the wiper blade was stopped).

Figure 12:
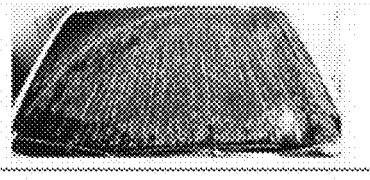

FIG. 12 is a photograph illustrating results of testing performance in cleaning the windshield glass under dry dust conditions for the wiper blade according to the embodiment of the present disclosure. It was ascertained that the wiper blade was excellent in cleaning performance in all the conditions of 2, 23, and 50 degrees.

Figure 13:
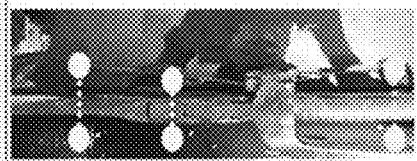

FIG. 13 is a view illustrating a result of testing whether the cleaning liquid sprayed from the nozzle can accurately reach the first and second water reaching points after the wiper blade according to the embodiment of the present disclosure is left unattended for 8 hours in a state of −20° C. It was ascertained that the cleaning liquid hit the first and second water reaching points at a temperature of −20° C. and thus the performance of the wiper blade was constantly maintained even under the severe external environment.

According to the wiper blade according to the present disclosure, the nozzle is installed on the wiper blade, and particularly, the nozzle is assembled to be accommodated in the wiper arm, thereby minimizing the influence applied to the nozzle by the external environment or external forces.

In addition, only the single nozzle may be used by optimally designing the water reaching points. Therefore, it is possible to reduce unnecessary waste of the cleaning liquid and obtain the sufficient cleaning performance by optimizing the cleaning liquid. In addition, since the simple assembling structure is applied, the costs required to manufacture and replace the wiper blade are reduced, such that the increase in costs of the vehicle is minimized, and the costs required to replace the wiper blade is reasonable in comparison with products of other companies.

While the specific embodiments of the present disclosure have been illustrated and described, it will be obvious to those skilled in the art that the present disclosure may be variously modified and changed without departing from the technical spirit of the present disclosure defined in the appended claims.

The invention claimed is:

1. A wiper blade assembly for a vehicle, the wiper blade assembly comprising:

a wiper arm having a first end installed at a windshield glass side, the wiper arm being configured to rotate, wherein an installation bracket is positioned at a second side of the wiper arm;

a blade mounted on the installation bracket of the wiper arm and configured to clean a windshield glass; and a nozzle installed on an assembling part extending outward from the installation bracket of the wiper arm, the nozzle being positioned between the assembling part and the blade, and the nozzle being configured to spray a cleaning liquid in a longitudinal direction in which the blade extends;

wherein the nozzle is assembled so that one surface of the nozzle and one surface of the blade adjoin each other, and the nozzle and the blade are located on the same plane;

wherein a support body having elasticity is provided on one surface of the nozzle, which adjoin the blade, and supports one surface of the blade;

wherein the assembling part is formed with an extension portion extending outward from the installation bracket and a bent portion at an end of the extension portion to form an installation space;

wherein the nozzle is positioned in the installation space so a spray port configured to spray the cleaning liquid is positioned between the assembling part and the blade; and wherein a cover configured to cover the wiper arm is positioned at an upper end of the wiper arm, wherein the cover is configured to cover the wiper arm and the extension portion of the wiper arm.

2. The wiper blade assembly of claim 1, wherein the nozzle is assembled by being fitted with the assembling part in a direction perpendicular to the assembling part of the installation bracket.

3. The wiper blade assembly of claim 1, wherein a catching groove is formed in the bent portion, a catching protrusion is formed on the nozzle, and the nozzle is assembled to the bent portion as the catching protrusion is fitted into the catching groove.

4. The wiper blade assembly of claim 1, wherein the nozzle comprises:

a nozzle body; and an outer part spaced apart outward from the nozzle body;

wherein the bent portion is fitted between the nozzle body and the outer part.

5. The wiper blade assembly of claim 4, wherein catching protrusions are formed on the nozzle body and the outer part so as to face each other, and the nozzle is assembled to the bent portion as the catching protrusions, which face each other, are fitted into a catching groove of the bent portion when the bent portion is fitted between the nozzle body and the outer part.

6. The wiper blade assembly of claim 1, wherein a hose configured to transmit the cleaning liquid to the nozzle is connected to an injection port of the nozzle.

7. The wiper blade assembly of claim 6, wherein a hose clip configured to fix the hose is provided at one side of the cover, and the hose is fitted with the hose clip.

* * * * *